(12) United States Patent
Roberts, Jr.

(10) Patent No.: US 7,070,195 B2
(45) Date of Patent: Jul. 4, 2006

(54) BOAT TRAILER

(76) Inventor: Ronald E Roberts, Jr., 2302 Medford La., Brandon, FL (US) 33511

( * ) Notice: Subject to any disclaimer, the term of this patent is extended or adjusted under 35 U.S.C. 154(b) by 0 days.

(21) Appl. No.: 10/777,494

(22) Filed: Feb. 12, 2004

(65) Prior Publication Data

US 2005/0179231 A1   Aug. 18, 2005

(51) Int. Cl.
*B60P 3/10* (2006.01)

(52) U.S. Cl. .................................. 280/414.1

(58) Field of Classification Search ............ 280/414.1, 280/414.2, 414.3, 124.17, 789; 114/344
See application file for complete search history.

(56) References Cited

U.S. PATENT DOCUMENTS

| | | | | |
|---|---|---|---|---|
| 3,276,790 A | * | 10/1966 | McKaig | 280/400 |
| 3,891,231 A | * | 6/1975 | Snoberger et al. | 280/788 |
| 3,993,324 A | * | 11/1976 | Carrick | 280/414.1 |
| 4,422,664 A | * | 12/1983 | Poveromo | 280/414.1 |
| 4,717,165 A | * | 1/1988 | Johnson | 280/414.1 |
| 4,872,653 A | * | 10/1989 | Chuchua | 267/271 |
| 5,823,559 A | * | 10/1998 | Priesgen et al. | 280/414.1 |
| 5,836,606 A | * | 11/1998 | Spoto et al. | 280/124.175 |
| 5,951,231 A | * | 9/1999 | Allen | 414/462 |
| 6,113,124 A | * | 9/2000 | Chambers | 280/414.1 |
| 6,250,662 B1 | * | 6/2001 | Poppell | 280/414.3 |
| 6,250,872 B1 | * | 6/2001 | Rahijarvi | 414/500 |
| 6,641,160 B1 | * | 11/2003 | Veal | 280/414.1 |

* cited by examiner

*Primary Examiner*—Tony Winner
(74) *Attorney, Agent, or Firm*—Yaté K. Cutliff, Attorney at Law

(57) ABSTRACT

A boat trailer comprising two side beams positioned adjacent to each other, wherein each of the side beams has a forward tongue forming portion converging toward the other side beam. The side beams can be connected to a towing vehicle and the side beams may also have a trailing boat-supporting portion. The trailer also includes at least one cross bar member extending between the boat-supporting portion of one of the side beams and the boat-supporting portion of the other side beam. The various members of the trailer may be punched with holes in a standard pattern.

12 Claims, 4 Drawing Sheets

BOAT TRAILER

FIELD OF THE INVENTION

The present invention relates generally to trailers and more specifically to boat trailers, particularly aluminum boat trailers.

DESCRIPTION OF THE RELATED ART

Previous boat trailer assembly methods have proven costly, inefficient and dangerous.

Trailers are assembled through the joining of beams and cross-beams. In order to maintain a clean line on the top of the trailer, the prior art taught that the bottom of the beam should be drilled so that the hardware used to connect the various beams would not extend to the surface of the trailer. In the prior art, one skilled in the art of assembling boat trailers would orient the boat trailers upside-down during the assembly process It was deemed advantageous to orient the trailer upside-down so that the assembly personnel could have access to the underside of the various beam members in order to drill the necessary holes.

In order to join the beam members, assembly personnel hand drilled the various holes in the beam members. Traditional circular threaded bolts would then be inserted into the various holes (since the trailer was being assembled upside down, the assembly person had to hold the bolt in place). Nuts would then be attached to the open end of the circular threaded bolt. The circular threaded bolts/nuts would then be tightened with two wrenches or sockets. Due to the nature of the hardware utilized to join the members, and because the trailer was being assembled upside-down, the assembly personnel had to manipulate both the head of the circular threaded bolt and the nut in order to secure them together.

Unfortunately, drilling the parts of the trailer frame while upside-down was costly because the holes had to be drilled individually by hand. Further, the handling required to flip the trailer onto its right-side-up position was slow, inefficient and potentially dangerous.

Another option available to one skilled in the art for assembling boat trailers was to weld the various beams together instead of drilling. Welding tended to be even more time and labor intensive than drilling and is thus disfavored.

The razor sharp edges of the fenders and other trailer accessories are another dangerous aspect of the prior art. Raw aluminum sheeting, from which the fenders and various trailer accessories are formed, has sheered edges. These sheered edges have been a continual source of injury to consumers and assembly personnel.

In the prior art, it is common to use leaf springs between the axle and the trailer as a mechanism to dampen the trailer against vibrations due to changes in road elevations, bumps, etc. In the trailers of the prior art, these springs are typically attached to the trailer through the use of hangers. Such trailers typically require a front and a rear hanger (the hangers being of different dimensions) in order to connect the spring to the trailer. Historically, the front hanger had an inside diameter equal to the width of a leaf spring eye in order for the front hanger to "receive" the leaf spring eye (this width was typically 1¾"). The trailing hanger on such trailers typically had an outside dimension equal to the width of the leaf spring eye (1¾") such that the leaf spring eye was connected to the trailing hanger by way of a planar shackle (the leaf spring eye would be bolted to two planar shackles at one end of the planar shackles, and then the other end of the planar shackles would be bolted to the trailing hanger). This system is disfavored because a manufacturer or repair facility had to stock two different hangers for each trailer model.

In view of the foregoing, it is an object of the present invention to provide a novel trailer which eliminates or minimizes the above-mentioned and other problems, limitations and disadvantages typically associated with trailers, particularly boat trailers. It is further an object of the invention to design a system in which it is easy to manufacture, easy to use, inexpensive, and reliable to assemble such trailers. Still other objects will become apparent in the following description of the invention.

SUMMARY OF THE INVENTION

This invention relates to a trailer which overcomes the disadvantages and dangers of the prior art. This invention also describes the method for manufacturing such a trailer.

In a preferred embodiment of the present invention, a punch can create holes in the I-beams instead of a drill. More specifically, but without restriction to the particular embodiment and/or use which is shown and described herein for purposed of illustration, it is an object of this invention to produce a clean looking trailer, a trailer which is easier to assemble than other trailers and a trailer which is less expensive to manufacture due to the automation of a punch and through the elimination of the need to assemble a trailer in an upside-down position.

In a preferred embodiment, carriage bolts can be used (although the term "carriage bolts" is referred to below, it is to be interpreted to include any acceptable attachment means). Carriage bolts eliminate the need to handle the screw from both sides. The carriage bolt will remain secure in a square hole; only the nut needs to be tightened. Because it is only necessary to have access to the bottom side of the bottom of the beam to tighten the nut, the trailer can be assembled in its right-side-up position. Note that the beams used are preferably I-beams.

Unfortunately, the decision to use carriage bolts presented additional technical problems that the inventor had to overcome. For example, when joining the cross bar members to the I-beams, the inside holes of the cross member were not accessible with a wrench, which meant that the nut could not be efficiently tightened. To solve this problem, the inventor added access holes in the bottom leg of the cross member. The access holes allow the use of a deep well impact socket to tighten the nut of the carriage bolt.

In a preferred embodiment of the invention, the nut that is used with the carriage bolt is a flange nut. The nut provides integrity of the assembly. Further, the flange on the nut allows the nut to rest in place in the socket.

In a preferred embodiment, the invention capitalizes on the ability to automate the punch to utilize a common hole pattern for punching the various members. Correspondingly, the invention also capitalizes on the elimination of drilling holes by hand. This simplifies the tooling to punch many variations of trailer frames. Further, the tooling to punch the I-beams is unique because it is capable of punching an infinite number of trailer designs. The tooling has the capability to change hole diameters to accommodate various design parameters.

In a preferred embodiment, the invention may implement a safe edge on the fenders of the trailer. The inventor overcame the danger caused by the razor sharp edge of the fender by cold-rolling the edge of the fender. Through the novel use of this process during the manufacture of a trailer, the cold-rolling eliminates the sharp edge of the fender, thereby increasing the safety of the trailer at little or no cost to the manufacturer. A further embodiment of this invention implements the safe edge on various other edges of the trailer.

In the present invention; the front and trailing hangers are identical. While the front leaf spring eye is attached in the same method as taught previously, the trailing leaf spring eye can be attached to the trailing hanger via the use of offset shackles to make the transition from 2¾" (outside dimension of hanger) to the 1¾" inside dimension of the trailing leaf spring eye. Thus, one advantage of standardizing the hanger dimensions is that the manufacturers can reduce their inventory by only having to stock one type of hangers through the use of the offset shackle.

In a preferred embodiment, the invention can provide a mount for a clearance light in the fender steps. The inventor was able to avoid the necessity of welding or riveting the fender step on a mounting point. In this embodiment of the invention, the light mounting point does not require any welding or other assembly. By forming the light under the step, the light can be protected.

In a preferred embodiment, the invention can cap the end of the I-beam with a light bracket. In a preferred embodiment, the light bracket is substantially S-shaped. The light bracket can have at least one vertical section and at least horizontal section. At least one horizontal surface of the light bracket can be suitable for attachment to the bottom surface of the I-beam and the top surface of the cross bar member. The same hole pattern that is used on the cross bar member can be stamped into the light bracket, which eliminates the need for any additional holes in order to mount the bracket. Then, the bracket can be placed between the top surface of the trailing cross bar member and the bottom surface of the I-beam. Finally, the bracket can be secured with bolts.

As described above, methods of production in the prior art consisted of hand drilling and welding. A more technologically advanced manufacturer might use drill presses. However, the concept of punching I-beams, standardizing the hole patterns and designing the various embodiments as described herein has produced a very unique boat trailer assembly. The end result of this invention is a trailer that is superior in quality and aesthetics and that is significantly less expensive to build than conventional methods.

BRIEF DESCRIPTION OF THE FIGURES

Further objects of this invention, together with additional features contributing thereto and advantages accruing therefrom, will be apparent from the following description of embodiments of the invention schematically illustrated in the drawings and which are shown in the accompanying drawings with like reference numerals indicating corresponding parts throughout and which are to be read in conjunction with the following drawings, in which.

DETAILED DESCRIPTION OF THE INVENTION

Figure 1:
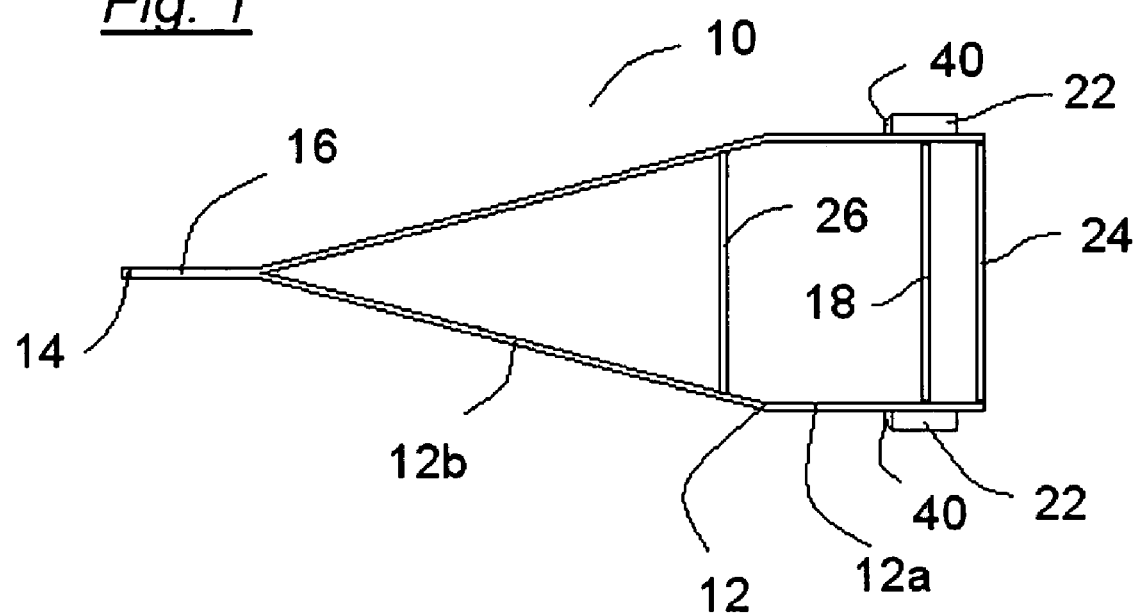
FIG. 1 is a perspective view of a trailer that embodies the invention.

Referring now to the drawings, various arrangements are illustrated for utilizing the present invention on a boat trailer. However, it is understood that the use of the invention on a boat trailer is a preferred embodiment, for purposes of illustration. The use of the present invention is not intended to be limited to boat trailers. As is known to those skilled in the art and as is depicted in FIG. 1, trailers 10 include a pair of side frame members, or side beams, 12 which have a spaced parallel load-supporting portion 12a, upon which an object is carried, and a forward converging or tongue-forming portion 12b, through which the trailer is connected to a towing vehicle by means of a trailer hitch coupling 14. In a preferred embodiment, the side beams 12 are I-beams and may be formed by aluminum or other suitable materials.

The trailer 10 also includes an axle 18 and springs (not shown) that may be longitudinally adjustable relative to the side beams 12. Rubber-tired wheels (not shown) are on the opposite ends of the axle 18, and each of the rubber-tired wheels may be at least partially covered by an associated fender 22. While a single axle arrangement is shown, a double axle or tandem wheel arrangement may be used, either of which may he moved along the side beams 12 to obtain a desired tongue weight distribution as is known to those skilled in the art. The forward ends of side beams 12 have portions that converge toward each other and that terminate on opposite sides with a tongue 16. The tongue 16 extends along a longitudinal centerline of the trailer frame, wherein the trailing end may be secured by any appropriate means to the side beams 12. In a preferred embodiment, the tongue 16 can be attached to the side beams 12 via nut/bolt combinations. The forward end of the tongue 16 has mounted thereon a hitch coupling 14 for connection to a cooperating connecting element on a powered vehicle that can be used for pulling the trailer. One skilled in the art will understand that additional elements not currently described herein, such as a winch stand, winch and cable can be included on the trailer 10.

The side beams 12 are laterally spaced by cross bar members 24, 26. In the form illustrated, the cross bar member 24 is mounted near the trailing end of the trailer, while cross bar member 26 is spaced forwardly thereof. Although two cross bar members are shown, more or less cross bar members may be utilized, depending on design considerations. Further, the exact placement, position, and spacing of the cross bar members will be determined by the weight distribution of the boat to be carried.

In a preferred embodiment, the invention may include a fender step 40 that can be secured to the side beams 12. Additional fender steps 40 may be placed on the trailer 10 as desired (note that these steps may be added by simply connecting them to a side beam, and it is not necessary that they connect with the fender).

Figure 2:
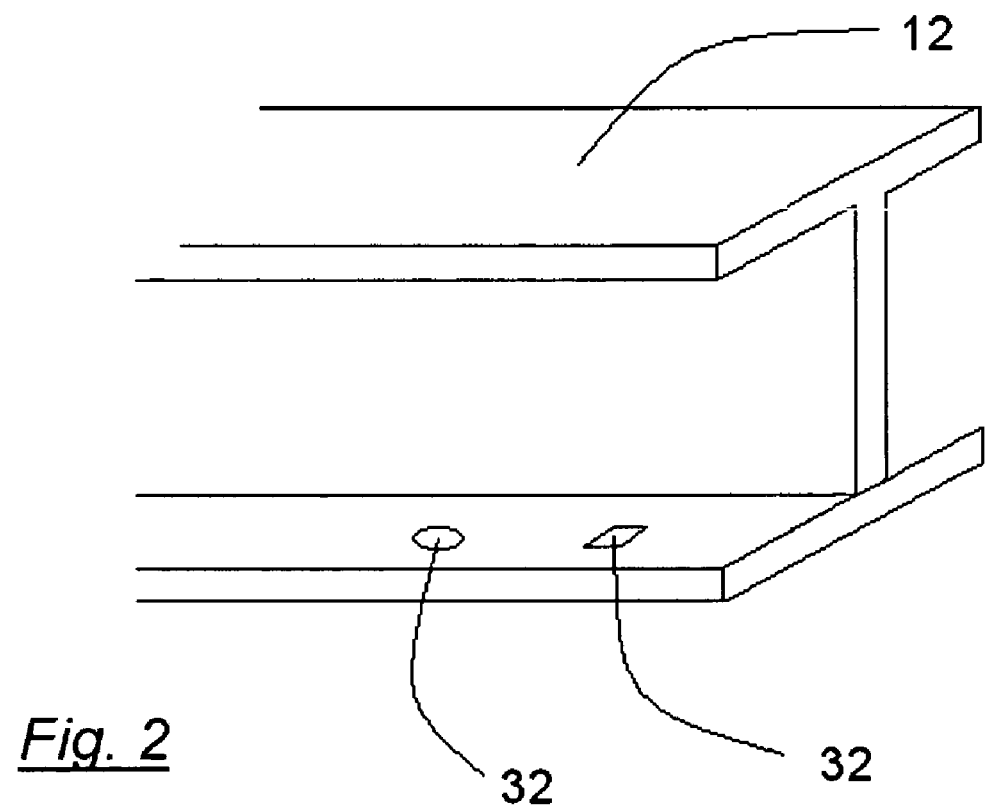
FIG. 2 is a perspective view of an I-beam.

As shown in FIG. 2, the side beams 12 in the present invention may have holes 32 punched into it. A punch press may be used to punch holes 32 in the side beams 12. The punch may be automated to standardize the hole 32 spacing, alignment and size. The punch may be air powered or powered by any acceptable means. In a preferred embodiment, the holes 32 may be square in order to utilize a carriage bolt (not shown) for the joining of a side beam 12 to a cross bar member (not shown). Further, it is to be understood that various trailer accessories, such as a lighting bracket (not shown), can also be attached to the side beam 12 or cross bar members (not shown) by using the holes 32 to secure the attachment.

Figure 3A:
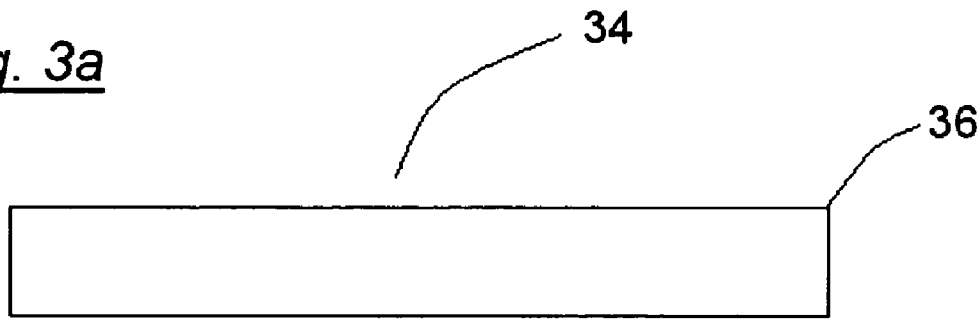
FIG. 3a is a side elevation view of a sharp edge caused by slitting or shearing.

In FIG. 3a, a side elevation view of sheeting 34 is shown, including a sharp edge 36, wherein the sheeting 34 may be used to form fenders and other trailer accessories.

Figure 3B:
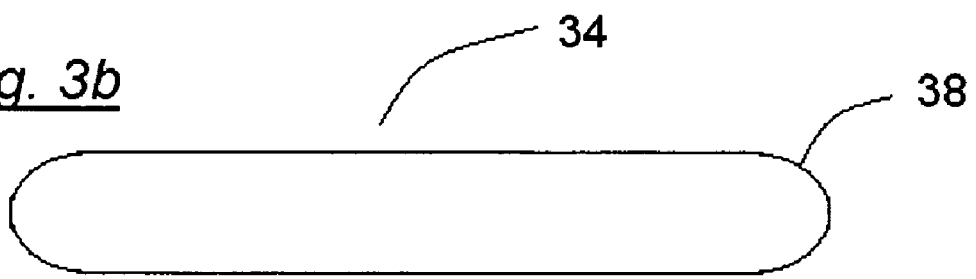
FIG. 3b is a side elevation view of a safe edge according to the invention.

FIG. 3b shows a side elevation view that illustrates a safe edge 38, wherein a safe edge 38 has been made safe by cold-rolling the edge of the sheeting 34 or by any other acceptable means.

Figure 4:
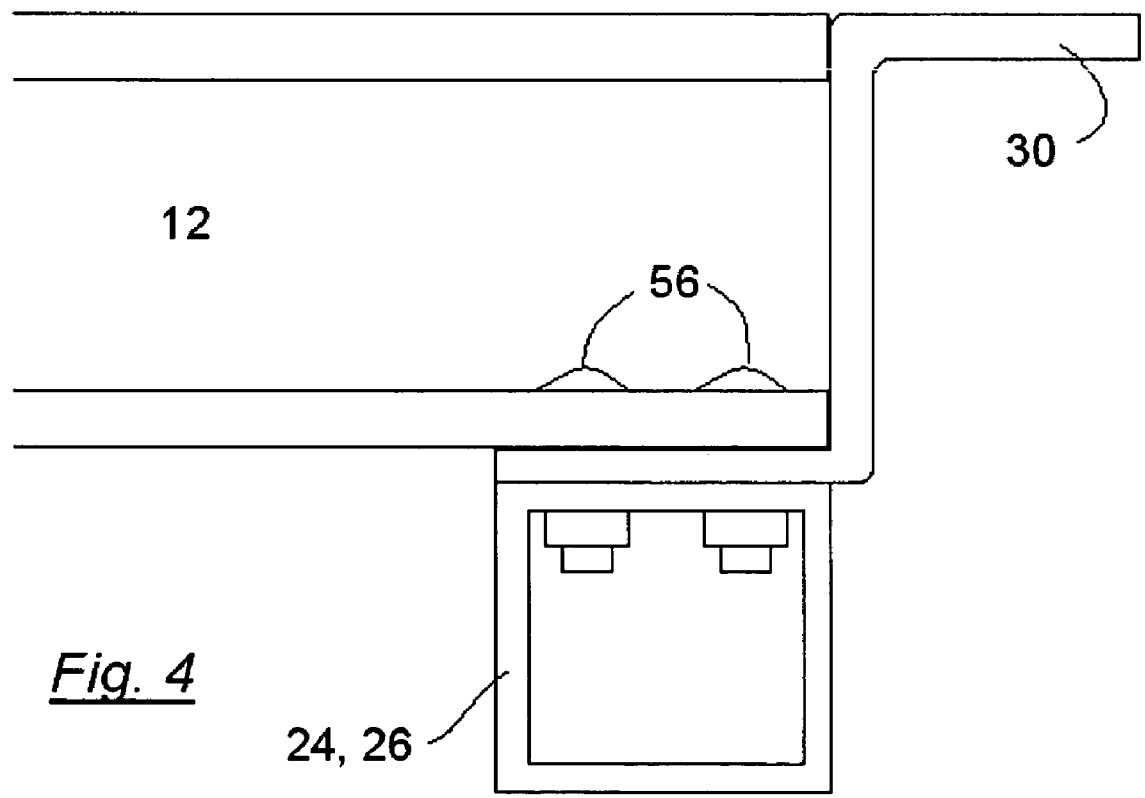
FIG. 4 is a plan view of a cross bar member, side beam and light bracket.

In FIG. 4, a plan view of a cross bar member 24, 26, side beam 12 and light bracket 30 is illustrated. In a preferred embodiment, the light bracket 30 may be secured in-between the cross bar member 24, 26 and the side beam 12 through the use of holes (not shown) punched into the three pieces. Carriage bolts 56 and flange nuts may be used to secure the three pieces together. It is understood that more than these three or less than these three pieces may be secured in this manner, and it is also understood that other pieces may be substituted for any or all of the specifically illustrated pieces. Additional lighting brackets 30 may be placed on the trailer as desired.

Figure 5A:
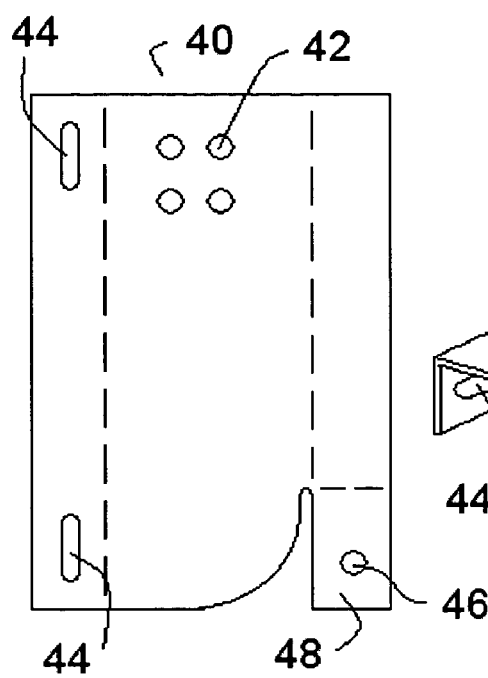
FIG. 5a is a plan view of a fender step with a light bracket in an intermediate stage of the manufacturing process.
Figure 5B:
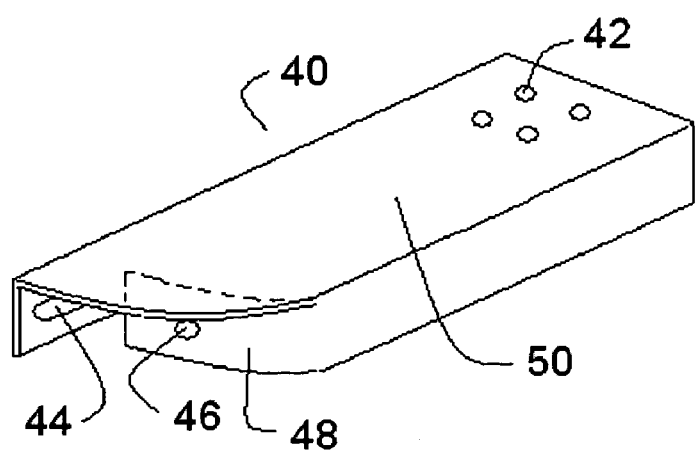
FIG. 5b is a perspective view of a fender step with a light bracket in an intermediate stage of the manufacturing process.

FIG. 5a is an illustration of a plan view of a fender step 40 with a light mounting portion 48 in an intermediate stage of the manufacturing process. The fender step 40 in this view is formed from a planar piece of metal or other suitable material and is cut to the desired shape. Further, the planar piece of metal may be bent or folded along the dashed lines, as illustrated in FIG. 5a, in order to form the three dimensional step, as illustrated in FIG. 5b. A punch may be used to create side beam mounting holes 42 for mounting the fender step 40 to the side beam (not shown). A punch may also be used to create fender-mounting holes 44 for mounting the fender step 40 to the fender (not shown) (note that the fender-mounting holes 44 may be elongated to allow for adjustment or to fit a variety of trailers). A punch may also be used to create a light-mounting hole 46 in a light mounting portion 48 of the fender step 40.

FIG. 5b is an illustration depicting the perspective view of a fender step 40 with a light mounting portion 48 in an intermediate stage of the manufacturing process. In this three dimensional representation of a fender step 40, the top portion 50 of the fender step 40 can protect a light (not shown) which may be mounted in the mounting portion 48.

Figure 6A:
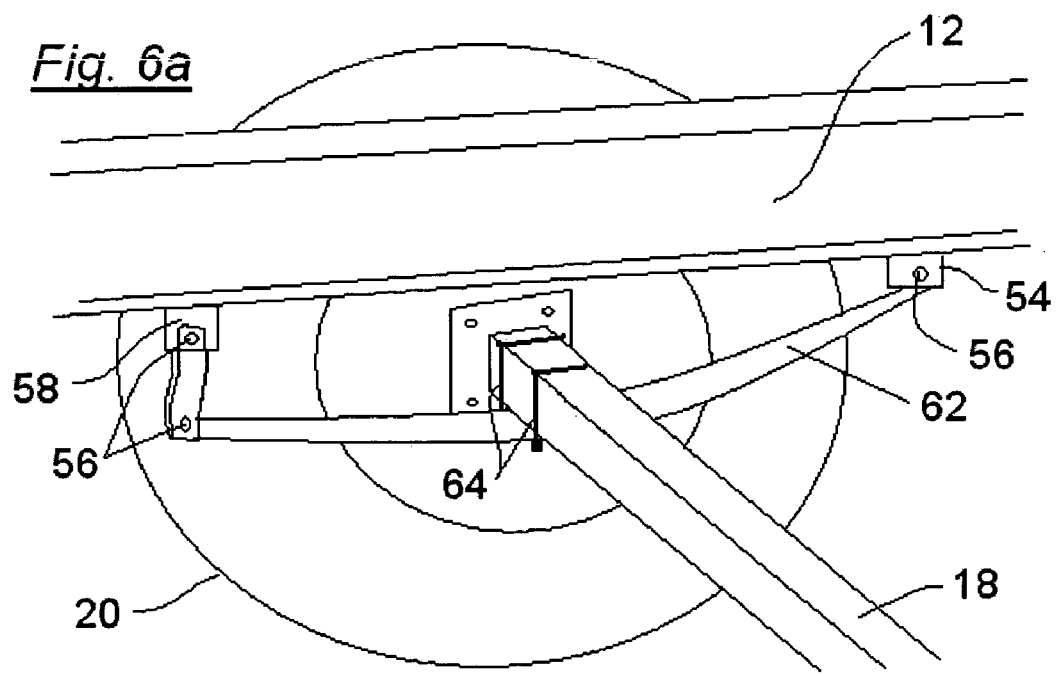
FIG. 6a is a plan view of the axle and spring portion of a trailer.

FIG. 6a is a perspective view of an axle 18 and spring 62 portion of a trailer. In a preferred embodiment, the axle 18 may have one rubber-tired wheel 20 on each end of the axle 18. The axle 18 may be affixed to a spring 62 via mounting U-bolts 64. The leaf spring eye (not shown) of the front end of the spring 62 may be affixed to the side beam 12 via a front mounting hanger 54 through the use of a bolt 56. The front mounting hanger 54 may be attached to the side beam 12 by various methods, including bolts (not shown). The leaf spring eye (not shown) of the trailing end of the spring 62 may be affixed to the side beam 12 via a trailing mounting hanger 58, through the use of a bolt 56. In the prior art, the front mounting hanger 54 and the trailing mounting hanger 58 were different dimensions. In the present invention, the front mounting hanger 54 and the back mounting hanger 58 may have identical dimensions.

Figure 6B:
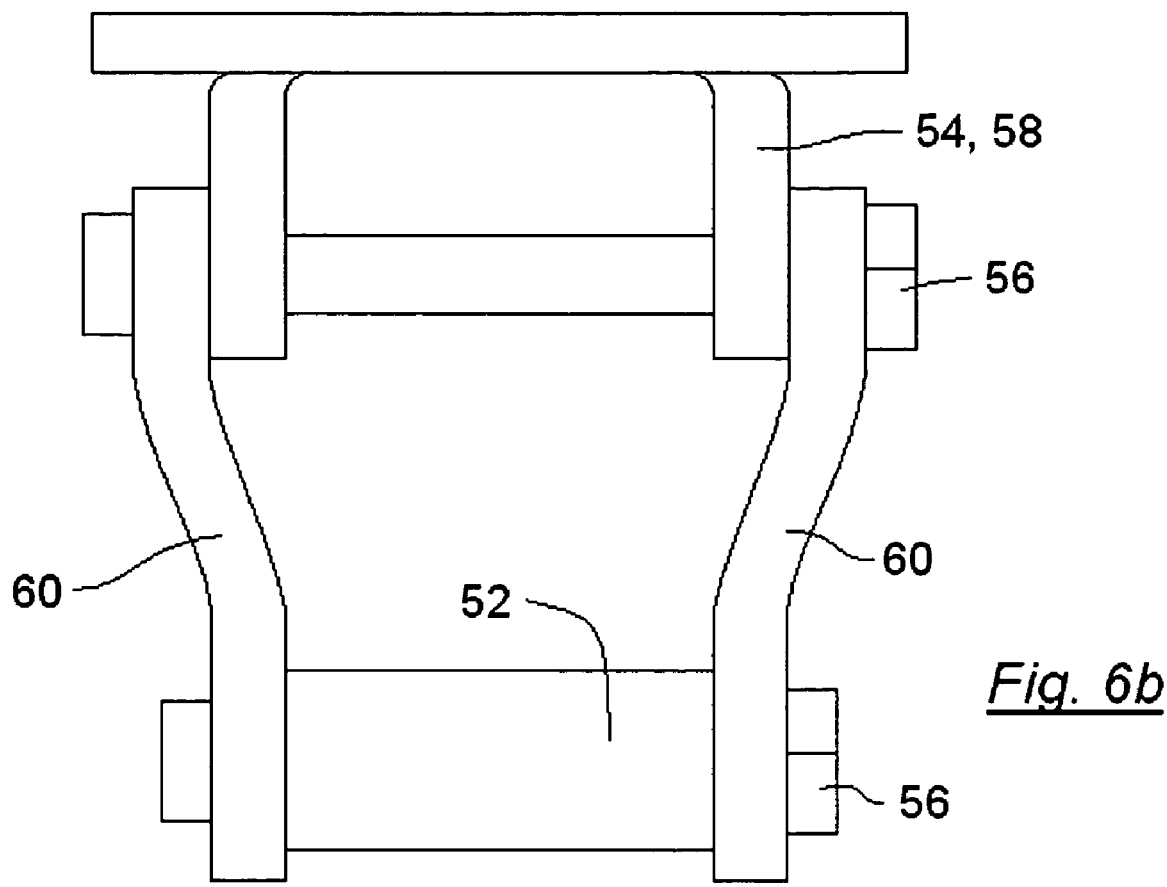
FIG. 6b is a plan view of a hanger.

FIG. 6b is a plan view of a hanger 54, 58. The leaf spring 52 is attached to an offset shackle 60 via a bolt 56 or other attachment means. The offset shackle 60 is then attached to the outside of the hanger 54, 58 via a bolt 56 or other attachment means. In a preferred embodiment, only the trailing hanger 58 has an offset shackle 60.

Figure 6C:
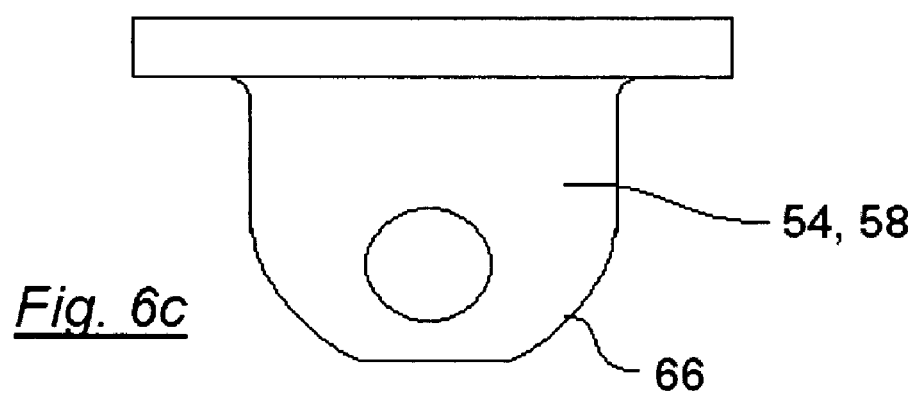
FIG. 6c is a plan view of a hanger.

FIG. 6c is a plan view of a hanger 54, 58. This figure illustrates that the hanger 54, 58 is preferably manufactured with relieved edges 66 to provide clearance for the shackle (not shown) to pivot.

While this invention has been described in the specification and illustrated in the drawings with reference to particular embodiments, the structure of which has been disclosed herein, it will be understood to those skilled in the art to which this invention pertains that various changes may be made and equivalents may be substituted for elements of the invention without departing from the scope of the claims. Therefore, it is intended that the invention not be limited to the particular embodiment disclosed in the specification and shown in the drawings as the best mode presently known by the inventor for carrying out this invention, nor confined to the details set forth, but that the invention will include all embodiments, modifications and changes as may come within the scope of the following claims.

The invention claimed is:

1. A boat trailer comprising:
    at least two side beams positioned adjacent to each other, wherein each one of said side beams has a forward tongue forming portion converging toward the other one of said side beams for connection to a towing vehicle and a trailing boat-supporting portion extending parallel to the one of said side beams for supporting a boat thereupon,
    wherein each said side beam has a top surface and a bottom surface,
    at least one cross bar member extending between the boat-supporting portion of one of said side beam and the boat-supporting portion of the other one of said side beam,
    wherein said cross bar member has a top surface and a bottom surface,
    said side beam being connected to a hanger,
    said hanger being connected to a spring,
    said spring being connected to an axle,
    a light bracket attached to the trailing end of said side beam,
    wherein said light bracket has at least one vertical section and at least one horizontal section,
    wherein at least one horizontal section of said light bracket is suitable for attachment to the bottom surface of said side beam and the top surface of said cross bar member, and
    wherein said light bracket is mounted between the bottom surface of said side beam and the top surface of said cross bar member.

2. The trailer according to claim 1, wherein said side beam is an aluminum I-beam.

3. The trailer according to claim 1, wherein said cross bar member has holes in said bottom surface of said cross bar member.

4. The trailer according to claim 1, wherein said light bracket has two horizontal sections,
    wherein at least a portion of one of said horizontal section is mounted between the -bottom surface of said side beam and the top surface of said cross bar member, and
    wherein a second horizontal section extends rearward of said side beam.

5. The process for making a boat trailer as set forth in claim 1, comprising:
punching at least one hole in at least one of: said side beams, or said cross bar member,
wherein said hole has at least two parallel edges.

6. The process for making a boat trailer according to claim 5, further comprising at least one of the following:
punching at least one hole in at least one fender,
wherein said wheel is at least partially covered by said fender,
punching at least one hole in at least one fender step,
wherein said fender step is connected to said fender and to said side beams,
wherein said fender step has a top portion and a bottom portion, and
wherein said hole has at least two parallel edges.

7. The process for making a boat trailer according to claim 5, further comprising punching at least one hole in at least one light bracket,
wherein said light bracket is attached to the trailing end of said side beam,
wherein said light bracket has at least one vertical section and at least one horizontal section,
wherein at least one horizontal section of said light bracket is suitable for attachment to the bottom surface of said side beam and the top surface of said cross bar member, and
wherein said light bracket is mounted between the bottom surface of said side beam and the top surface of said cross bar member,
wherein said hole has at least two parallel edges.

8. A boat trailer comprising:
two side beams positioned adjacent to each other, wherein each one of said side beams has a forward tongue forming portion converging toward the other one of said side beams for connection to a towing vehicle and a trailing boat-supporting portion extending parallel to the one of said side beams for supporting a boat thereupon,
at least one cross bar member extending between the boat-supporting portion of one of said side beams and the boat-supporting portion of the other one of said side beams,
at least two identical hangers, wherein said two identical hangers are connected to each of said side beams, at least one spring,
said hangers have relieved edges,
wherein said spring has two ends,
wherein a first end of said spring is received by one of said hangers,
at least two offset shackles,
wherein each of said offset shackle has two ends,
wherein a second end of said spring is connected to a first end of each of said offset shackles,
wherein a second end of each of said offset shackles is connected to said other hanger,
at least one axle,
wherein said axle is attached to said spring, and
wherein said axle has a rubber-tired wheel attached thereto.

9. A boat trailer comprising:
two side beams positioned adjacent to each other,
wherein each one of said side beams has a forward tongue forming portion converging toward the other one of said side beams for connection to a towing vehicle and a trailing boat-supporting portion extending parallel to the one of said side beams for supporting a boat thereupon,
at least one cross bar member extending between the boat-supporting portion of one of said side beam and the boat-supporting portion of the other one of said side beam,
said side beam being connected to a hanger,
said hanger being connected to a spring,
said spring being connected to an axle,
at least one fender,
wherein said wheel is at least partially covered by said fender,
at least one fender step,
wherein said fender step is connected to said fender and to said side beams,
wherein said fender step has a top portion and a bottom portion, and
a fender light,
wherein said fender light is connected to said fender step in said bottom portion of said fender step.

10. The boat trailer according to claim 9, wherein said fender light does not extend past said top portion of said fender step.

11. The boat trailer according to claim 9, wherein at least one of said fenders and said fender steps have cold-rolled edges.

12. The process for making a boat trailer as set forth in claim 9, comprising:
folding a planar piece of metal or other suitable material to form said fender step.

* * * * *